(12) United States Patent
Thornton et al.

(10) Patent No.: US 7,538,469 B2
(45) Date of Patent: May 26, 2009

(54) SYNCHRONOUS MACHINE DESIGN AND MANUFACTURING

(75) Inventors: Richard D. Thornton, Concord, MA (US); Tracy M. Clark, Bedford, MA (US)

(73) Assignee: MagneMotion, Inc., Devens, MA (US)

( * ) Notice: Subject to any disclaimer, the term of this patent is extended or adjusted under 35 U.S.C. 154(b) by 637 days.

(21) Appl. No.: 11/172,006

(22) Filed: Jun. 30, 2005

(65) Prior Publication Data

US 2005/0242675 A1    Nov. 3, 2005

Related U.S. Application Data

(62) Division of application No. 10/262,541, filed on Oct. 1, 2002, now Pat. No. 6,917,136.

(60) Provisional application No. 60/326,278, filed on Oct. 1, 2001.

(51) Int. Cl.
*H02K 1/06* (2006.01)
*H02K 41/03* (2006.01)
*H02K 19/00* (2006.01)

(52) U.S. Cl. ................ 310/254; 310/12; 310/180; 310/261; 310/156.45; 310/166

(58) Field of Classification Search .......... 310/254, 310/12, 166, 154.45, 261, 180
See application file for complete search history.

(56) References Cited

U.S. PATENT DOCUMENTS

| | | | |
|---|---|---|---|
| 3,029,893 A | 4/1962 | Mountjoy | |
| 3,440,600 A | 4/1969 | Frech et al. | |
| 3,532,934 A | 10/1970 | Ballman | |
| 3,609,676 A | 9/1971 | Jauquet et al. | 340/23 |
| 3,617,890 A | 11/1971 | Kurauchi et al. | 325/51 |
| 3,628,462 A | 12/1971 | Holt | 104/105 |
| 3,636,508 A | 1/1972 | Ogilvy et al. | 340/47 |

(Continued)

FOREIGN PATENT DOCUMENTS

DE    235 786 A3    5/1986

(Continued)

OTHER PUBLICATIONS van Zyl et al. ("Novel secondary design for a linear synchronous motor using a split-pole magnet arrangement" AFRICON, 1999 IEEE, vol. 2, Sep. 28-Oct. 1, 1999 pp. 627-630).*

(Continued)

*Primary Examiner*—Burton Mullins
(74) *Attorney, Agent, or Firm*—Nutter McClennen & Fish LLP; David J. Powsner; Joshua T. Matt

(57) ABSTRACT

Synchronous motors according to the invention operate at higher efficiency, with lower cost, reduced mass and reduced cogging. Magnet dimensions are selected that reduce cogging forces to a negligible amount even though there are fewer slots than normal. Optionally, it is possible to use non-overlapping windings with deeper and open slots. The approach is applicable to both rotary and linear motors and motors using either permanent magnets or electromagnets in the field structure. It is particularly relevant to linear or rotary motors that have a large air gap, and to small motors that must deliver a high ratio of thrust or torque to motor mass.

6 Claims, 7 Drawing Sheets

U.S. PATENT DOCUMENTS

| | | | |
|---|---|---|---|
| 3,679,874 A | 7/1972 | Fickenscher | 235/61.7 |
| 3,768,417 A | 10/1973 | Thornton et al. | |
| 3,772,640 A | 11/1973 | Auer, Jr. et al. | 340/23 |
| 3,786,411 A | 1/1974 | Kurauchi et al. | 340/23 |
| 3,845,720 A | 11/1974 | Bohn et al. | 104/148 |
| 3,858,521 A | 1/1975 | Atherton | 104/148 |
| 3,860,843 A * | 1/1975 | Kawasaki et al. | 310/67 R |
| 3,874,299 A | 4/1975 | Silva et al. | 104/130 |
| 3,906,436 A | 9/1975 | Kurauchi et al. | 340/23 |
| 3,912,992 A | 10/1975 | Lamb | |
| 3,927,735 A | 12/1975 | Miericke et al. | 104/148 |
| 3,979,091 A | 9/1976 | Gagnon et al. | 246/8 |
| 4,023,753 A | 5/1977 | Dobler | 246/5 |
| 4,061,089 A | 12/1977 | Sawyer | 104/23 |
| 4,065,706 A | 12/1977 | Gosling et al. | 318/254 |
| 4,132,175 A | 1/1979 | Miller et al. | |
| 4,292,465 A | 9/1981 | Wilson et al. | 178/3 |
| 4,361,202 A | 11/1982 | Minovitch | 180/168 |
| 4,424,463 A * | 1/1984 | Musil | 310/49 R |
| 4,441,604 A | 4/1984 | Schlig et al. | 198/598 |
| 4,522,128 A | 6/1985 | Anderson | 104/130 |
| 4,633,108 A | 12/1986 | von der Heide | |
| 4,638,192 A * | 1/1987 | von der Heide | 310/12 |
| 4,665,829 A | 5/1987 | Anderson | 104/124 |
| 4,665,830 A | 5/1987 | Anderson et al. | 104/124 |
| 4,671,185 A | 6/1987 | Anderson et al. | 104/130 |
| 4,726,299 A | 2/1988 | Anderson | 104/88 |
| 4,776,464 A | 10/1988 | Miller et al. | 209/3.3 |
| 4,794,865 A | 1/1989 | Lindberg | 104/246 |
| 4,800,328 A | 1/1989 | Bolger et al. | 320/2 |
| 4,836,344 A | 6/1989 | Bolger | 191/10 |
| 4,847,526 A * | 7/1989 | Takehara et al. | 310/185 |
| 4,914,539 A | 4/1990 | Turner et al. | 361/18 |
| 4,972,779 A | 11/1990 | Morishita et al. | |
| 5,032,746 A | 7/1991 | Ueda et al. | 310/12 |
| 5,032,747 A | 7/1991 | Sakamoto | |
| 5,108,052 A | 4/1992 | Malewicki et al. | 246/5 |
| 5,126,606 A | 6/1992 | Hofmann | 310/49 |
| 5,152,227 A | 10/1992 | Kato | 104/286 |
| 5,161,758 A | 11/1992 | Shuto | 246/419 |
| 5,178,037 A | 1/1993 | Mihirogi | 74/569 |
| 5,180,041 A | 1/1993 | Shuto | 191/53 |
| 5,193,767 A | 3/1993 | Mihirogi | 246/418 |
| 5,214,323 A | 5/1993 | Ueda et al. | 310/12 |
| 5,214,981 A | 6/1993 | Weinberger et al. | 74/573 |
| 5,242,136 A | 9/1993 | Cribbens et al. | 246/34 |
| 5,247,890 A | 9/1993 | Mihirogi | 104/130 |
| 5,251,563 A | 10/1993 | Staehs et al. | 104/168 |
| 5,263,670 A | 11/1993 | Colbaugh et al. | 246/63 |
| 5,267,514 A | 12/1993 | Staehs et al. | 104/246 |
| 5,277,124 A | 1/1994 | DiFonso et al. | 104/130 |
| 5,277,125 A | 1/1994 | DiFonso et al. | 104/292 |
| 5,293,308 A | 3/1994 | Boys et al. | 363/37 |
| 5,325,974 A | 7/1994 | Staehs | 211/60.1 |
| 5,409,095 A | 4/1995 | Hoshi et al. | 198/372 |
| 5,435,429 A | 7/1995 | Van Den Goor | 189/890.1 |
| 5,444,341 A | 8/1995 | Kneifel, II et al. | 318/432 |
| 5,450,305 A | 9/1995 | Boys et al. | 363/24 |
| 5,452,663 A | 9/1995 | Berdut | 104/283 |
| 5,467,718 A | 11/1995 | Shibata et al. | 104/284 |
| 5,517,924 A | 5/1996 | He et al. | 104/286 |
| 5,519,266 A | 5/1996 | Chitayat | 310/12 |
| 5,521,451 A | 5/1996 | Oudet et al. | 310/266 |
| 5,523,637 A | 6/1996 | Miller | 310/156 |
| 5,528,113 A | 6/1996 | Boys et al. | 318/16 |
| 5,551,350 A | 9/1996 | Yamada et al. | 104/293 |
| 5,573,090 A | 11/1996 | Ross | 191/10 |
| 5,590,604 A | 1/1997 | Lund | 104/88.04 |
| 5,590,995 A | 1/1997 | Berkers et al. | 414/357 |
| 5,592,158 A | 1/1997 | Riffaud | 340/941 |
| 5,595,121 A | 1/1997 | Elliott et al. | 104/53 |
| 5,619,078 A | 4/1997 | Boys et al. | 307/85 |
| 5,642,013 A * | 6/1997 | Wavre | 310/254 |
| 5,708,427 A | 1/1998 | Bush | 340/941 |
| 5,709,291 A | 1/1998 | Nishino et al. | 191/10 |
| 5,720,454 A | 2/1998 | Bachetti et al. | 246/34 |
| 5,723,917 A | 3/1998 | Chitayat | 310/12 |
| 5,757,100 A | 5/1998 | Burgbacher | 310/186 |
| 5,757,288 A | 5/1998 | Dixon et al. | 340/941 |
| 5,821,638 A | 10/1998 | Boys et al. | 307/104 |
| 5,839,554 A | 11/1998 | Clark | 191/10 |
| 5,898,579 A | 4/1999 | Boys et al. | 363/23 |
| 5,900,728 A | 5/1999 | Moser et al. | 324/244 |
| 5,906,647 A | 5/1999 | Zyburt et al. | 701/24 |
| 5,910,691 A | 6/1999 | Wavre | |
| 5,927,657 A | 7/1999 | Takasan et al. | 246/194 |
| 5,952,743 A | 9/1999 | Sidey | 310/12 |
| 5,990,592 A | 11/1999 | Miura et al. | 310/156 |
| 6,005,511 A | 12/1999 | Young et al. | 342/70 |
| 6,008,552 A | 12/1999 | Yagoto et al. | 310/12 |
| 6,011,508 A | 1/2000 | Perreault et al. | 342/350 |
| 6,025,659 A * | 2/2000 | Nashiki | 310/12 |
| 6,032,110 A | 2/2000 | Ishihara et al. | 702/150 |
| 6,034,499 A | 3/2000 | Tranovich | 318/650 |
| 6,064,301 A | 5/2000 | Takahashi et al. | 340/435 |
| 6,081,058 A | 6/2000 | Suzuki et al. | 310/156 |
| 6,087,742 A * | 7/2000 | Maestre | 310/12 |
| 6,089,512 A | 7/2000 | Ansorge et al. | 246/194 |
| 6,100,821 A | 8/2000 | Tanji et al. | 340/988 |
| 6,101,952 A | 8/2000 | Thornton et al. | 104/282 |
| 6,104,117 A * | 8/2000 | Nakamura et al. | 310/254 |
| 6,137,424 A | 10/2000 | Cohen et al. | 340/933 |
| 6,225,919 B1 | 5/2001 | Lumbis et al. | 340/933 |
| 6,242,822 B1 * | 6/2001 | Strothmann et al. | 310/12 |
| 6,286,434 B1 | 9/2001 | Fischperer | |
| 6,376,957 B1 * | 4/2002 | Haydock et al. | 310/155 |
| 6,418,857 B1 | 7/2002 | Okano et al. | |
| 6,495,941 B1 | 12/2002 | Nishimura | |
| 6,499,701 B1 | 12/2002 | Thornton et al. | 246/194 |
| 6,534,894 B1 * | 3/2003 | Flowerday | 310/268 |
| 6,684,794 B2 | 2/2004 | Fiske et al. | |

FOREIGN PATENT DOCUMENTS

| | | | |
|---|---|---|---|
| DE | 195 35 856 A1 | | 3/1997 |
| EP | 0 229 669 | | 7/1987 |
| EP | 0 482 424 B1 | | 10/1996 |
| EP | 740 405 | * | 10/1996 |
| EP | 1 283 586 A1 | | 12/2003 |
| JP | 63-310357 | * | 12/1988 |
| JP | 8-129336 | | 5/1996 |
| JP | 8-205514 | * | 8/1996 |
| JP | 11-341785 | * | 5/1998 |
| KR | 91-4927 | | 3/1991 |
| SU | 1140212 A | | 2/1985 |
| WO | WO 95/21405 | | 8/1995 |

OTHER PUBLICATIONS

Ackermann et al., ("New technique for reducing cogging torque in a class of brushless DC motors") IEE Proceedings-B, vol. 139, No. 4, Jul. 1992.*

Hwang et al. ("Various Design Techniques to Reduce Cogging Torque by Controlling Energy Variation in Permanent Magnet Motors") IEEE Transactions on Magnetics, vol. 37, No. 4, Jul. 2001.*

Hendershot et al. ("Design of Brushless Permanent-Magnet Motors") pp. 3-48 to 3-67 and 5-28, Magna Physics Publ.& Clarendon Press, Oxford, 1994.*

Hanselman, "Brushless Permanent Magnet Motor Design", 2nd Edition, Chap. 9.2-9.4, pp. 209-219, Jun. 2006.*

Eghtesadi, M. "Inductive Power Transfer to an Electric Vehicle-Analytical Model," 40th IEEE Vehicular Technology Conference (May 6-9, 1990) Orlando, FL, pp. 100-104.

Stevens, Bruce W. "Asynchronous Bidirectional Network Interface Enabling Seamless Concurrent Processing in a Distributed Heterogeneous Multiprocessor System," U.S. Appl. No. 783,661, filed Oct. 28, 1991, Office of the Chief of Naval Research.

Hughes, Austin. *Electric Motors and Drives* (Newnes: Oxford, 1990), Table of Contents (pp. v-xiii), Chapter 9 "Synchronous, Switched Reluctance and Brushless D.C. Drives," (pp. 293-315).

Basak, Amitava. *Permanent-Magnet DC Linear Motors* (Clarendon Press: Oxford, 1996), Table of Contents (pp. ix-xi), Chapter 2 "Types of DC Linear Motor" (pp. 21-41) and Chapter 5 "Supports and Guidance" (pp. 90-104).

Gieras, Jacek F. et al. *Linear Synchronous Motors: Transportation and Automation Systems* (CRC Press: New York, 2000), Table of Contents, Chapter 6 "High Speed Maglev Transport" (pp. 177-215).

Hor, P.J.; Zhu, Z.Q.; Howe, D.; Rees-Jones, "Minimization of cogging force in a linear permanent magnet motor", IEEE Transactions on Magnetics, vol. 34, Issue 5, Sep. 1998, (pp. 3544-3547).

Chang Seop Koh and Jin-Soo Seol, "New cogging-torque reduction method for brushless permanent-magnet motors", IEEE Transactions on Magnetics, vol. 39, Issue 6, Nov. 2003 (pp. 3503-3506).

van Zyl, A.W. and C.F. Landy, "Reduction of cogging forces in a tubular linear synchronous motor by optimizing the secondary design", Africon Conference in Africa, 2002. IEEE Africon 6$^{th}$, vol. 2, Oct. 2-4, 2002 (pp. 689-692).

Zhu, Z.O., et al., "Reduction of cogging forces in slotless linear permanent magnet motors", IEEE Proceedings-Electric Power Application, vol. 144, Issue 4, Jul. 1997 (pp. 277-282).

Zhu, Z.Q., et al., "Novel linear tubular brushless permanent magnet motor", Electrical Machines and Drives, 1997 Eighth International Conference on (Conf. Publ. No. 444), Sep. 1-3, 1997 (pp. 91-95).

Breton, C., et al., "Influence of machine symmetry on reduction of cogging torque in permanent-magnet brushless motors", IEEE Transactions on Magnetics, vol. 36, Issue 5, Sep. 2000 (pp. 3819-3823).

Li, Touzhu and G. Siemon, "Reduction of Cogging Toruqe in Permanent Magnet Motors", IEEE Transactions on Magnetics, vol. 24, No. 6, Nov. 1998 (pp. 2901-2903).

\* cited by examiner

SYNCHRONOUS MACHINE DESIGN AND MANUFACTURING

This application is a divisional application of U.S. patent application Ser. No. 10/262,541, filed Oct. 1, 2002, entitled "Synchronous Machine Design and Manufacturing," which claims the benefit of priority of U.S. Ser. No. 60/326,278, filed Oct. 1, 2001, entitled "Synchronous Machine Design and Manufacturing," the teachings of which are incorporated herein by reference.

BACKGROUND OF THE INVENTION

This patent pertains to the design and manufacture of linear and rotary synchronous motors and generators. The invention has application to virtually all synchronous machines, particularly those that use permanent magnets for the field.

The design and manufacture of synchronous motors has been carried on for over 100 years, but the applications have been primarily for low power motors where synchronism is essential and for high power motors where efficiency and size advantages overcome other disadvantages.

Nicola Tesla invented the induction motor in 1888 and since then the induction motor, also called an asynchronous motor, has dominated the market for rotary motors. The induction motor has been the preferred choice for electric utility powered motors because they have been less expensive to build and to control, and they were not cost-effective for most variable speed applications.

The increased use of synchronous motors is due to the evolution of microprocessors designed specifically for motor control, the availability of more cost effective power electronics, better permanent magnets, and the increased recognition that variable speed operation allows performance advantages. For example, the permanent magnet rotary synchronous motor is receiving serious attention as a candidate for electric vehicle propulsion and for low speed, high torque applications where induction motor alternatives are heavy, inefficient and expensive. The linear version of this motor, called the Linear Synchronous Motor (LSM), is now used for applications that cannot be effectively addressed by the linear induction motor (LIM) and as a replacement for rotary motors driving wheels.

It should be recognized that that there is usually very little difference between the design of a motor and the design of a generator (or alternator). Hence, in all discussion herein, the term motor should be interpreted as implying both motors and generators and machines designed to perform both functions.

There are several problems that motor designers must address: reducing size and weight, increasing efficiency, decreasing cost, eliminating cogging or ripple force, and simplifing manufacturing. Many patents have been issued that attempt to show how to improve synchronous machines with respect to these factors: U.S. Pat. No. 6,081,058 (Motor Structure Having a Permanent Magnet Motor with Grooves to Reduce Torque Ripples); U.S. Pat. No. 5,990,592 (Magnets Containing-Type Alternating-Current Motor and Method of Designing the Same); U.S. Pat. No. 5,757,100 (Method & Apparatus for Reducing Cogging Torque in an Electric Motor); U.S. Pat. No. 5,723,917 (Flat Linear Motor); U.S. Pat. No. 5,523,637 (Permanent Magnet Electrical Machine with Low Reluctance Torque); U.S. Pat. No. 5,521,451 and U.S. Pat. No. 5,126,606 (Low-cost Stepping or Synchronous Motor and Electric Drive Motor, Especially for Control and Regulation); U.S. Pat. No. 5,519,266 (High Efficiency Linear Motor); U.S. Pat. No. 5,444,341 (Method and Apparatus for Torque Ripple Compensation); U.S. Pat. No. 5,214,323 and U.S. Pat. No. 5,032,746 (Linear Motor with Reduced Cogging and Linear Motor with Driving Device). In every one of these patents, the focus is on solving a single problem and the result is degradation in some other aspect of the motor performance and/or manufacturing cost.

The problems identified above are so important that they are dealt with in some detail, and without adequate resolution, in reference books on synchronous motor design. Examples include Gieras, Jacek and Piech, Zbigniew, *Linear Synchronous Motors, Transportation and Automation Systems*, CRC Press, 2000; Nassar, *Linear Motors*, Wiley, 1994; Hughes, Austin; *Electric Motors and Drives: Fundamentals, Types and Applications*, $2^{nd}$ Edition; Butterworth-Heinemann, 1993

In view of the foregoing, an object of the invention is to provide improved synchronous machines, including synchronous motors, and methods for design and manufacture thereof, with improved performance and lower manufacturing cost.

SUMMARY OF THE INVENTION

The invention provides novel synchronous machines and methods of design and construction thereof, more particularly, for example, to increase performance and decrease cost based a variety of combinations of: (i) selection of magnet and winding-slot size to eliminate cogging forces, (ii) use a winding that consists of non-overlapping coils so as to simplify manufacture and allow deeper slots; (iii) omission of extensions on the pole tips so that prewound coils can be inserted over the pole tips and thereby reduce winding resistance and inductance; and (iv) reduction of the number of slots for windings The invention has application, by way of non-limiting example, to propulsion of vehicles for material handling and transportation and to combined magnetic suspension and propulsion. The invention is also applicable to both rotary and linear synchronous machines and to machines with either a permanent magnet or electromagnetic fields.

Synchronous machines according to the invention provide improved performance at reduced cost for any one or more of the following reasons:

i. The shape of the magnetic and ferromagnetic components eliminates cogging or ripple forces without the need to use skewed slots or other performance degrading means.

ii. The primary winding is constructed with non-overlapping coils so as to reduce end turn length;

iii. The primary ferromagnetic structure uses poles with no (or substantially no) pole extensions so that pre-wound coils can be inserted over the poles; and/or iv. The number of slots for windings is significantly less than most contemporary designs.

The invention provides, inter alia, for use of these methodologies in a variety of combinations so as to achieve a superior ratio of performance to cost. Thus, according to one aspect of the invention, there are provided synchronous machines and motors with magnetic and ferromagnetic components shaped to eliminate cogging or ripple forces (without the need to use skewed slots or other performance degrading means) that, additionally, have a primary winding constructed with non-overlapping coils so as to reduce end turn length.

According to a related aspect of the invention, there are provided synchronous machines and motors with magnetic and ferromagnetic components shaped to eliminate cogging or ripple forces (without the need to use skewed slots or other performance degrading means) that, additionally, have a primary ferromagnetic structure with poles with no (or substantially no) pole extensions.

According to another related aspect of the invention, there are provided synchronous machines and motors with magnetic and ferromagnetic components shaped to eliminate cogging or ripple forces (without the need to use skewed slots or other performance degrading means) that, additionally, have a reduced number of slots for windings.

Still other aspects of the invention provide synchronous machines and motors with a primary winding constructed with non-overlapping coils so as to reduce end turn length and, additionally, with a primary ferromagnetic structure that has poles with no (or substantially no) pole extensions.

A related aspect of the invention provides synchronous machines and motors with a primary winding constructed with non-overlapping coils so as to reduce end turn length and, additionally, with a reduced number of slots for windings.

Yet still other aspects of the invention provide synchronous machines and motors with a primary ferromagnetic structure with no (or substantially no) pole extensions and, additionally, with a reduced number of slots for windings.

Still yet other aspects of the invention provide synchronous machines and motors with magnetic and ferromagnetic components shaped to eliminate cogging or ripple forces (without the need to use skewed slots or other performance degrading means), additionally, with a primary winding constructed with non-overlapping coils so as to reduce end turn length and, further, with a primary ferromagnetic structure with no (or substantially no) pole extensions.

Yet still other aspects of the invention provide synchronous machines and motors with magnetic and ferromagnetic components shaped to eliminate cogging or ripple forces (without the need to use skewed slots or other performance degrading means) and, additionally, with a primary winding constructed with non-overlapping coils so as to reduce end turn length and, further, with a reduced number of slots for windings.

Still yet other aspects of the invention provide synchronous machines and motors with a primary winding constructed with non-overlapping coils so as to reduce end turn length, a primary ferromagnetic structure with no (or substantially no) pole extensions so that pre-wound coils can be inserted over the poles, and with a reduced number of slots for windings.

Further aspects of the invention provide synchronous machine/motors with magnetic and ferromagnetic components shaped to eliminate cogging or ripple forces (without the need to use skewed slots or other performance degrading means), a primary winding constructed with non-overlapping coils so as to reduce end turn length, a primary ferromagnetic structure that has poles with no (or substantially no) pole extensions so that pre-wound coils can be inserted over the poles, and with a reduced number of slots for windings.

According to further aspects of the invention, there are provided vehicles propelled by synchronous linear motors according to the foregoing.

Another aspect of the invention provides a vehicle propelled by a linear motor of the type described above with a permanent magnet field on the vehicle. The combination of relatively fewer and deeper winding slots achieves high force per unit area without excessive heating. The magnet is sized to virtually eliminate cogging and to minimize magnet cost. The combination produces a lower than normal ratio of attractive force between the stator and vehicle for a given propulsive force on the vehicle.

According to another aspect of the invention, there is provided a rotary motor built according to the foregoing with a high ratio of torque to motor mass. This is accomplished by using relatively small permanent magnets on larger-than-normal rotor diameter but without the need to use narrow slots to reduce cogging.

These and still other aspects of the invention are evident in the drawings and in the description that follows.

BRIEF DESCRIPTION OF THE DRAWINGS

A more complete understanding of the invention may be attained by reference to the description below, taken together with drawings, in which:

FIG. 4 shows the magnetic field lines for two examples of an LSM constructed according to the invention.

DETAILED DESCRIPTION OF THE ILLUSTRATED EMBODIMENTS

Theory of Operation

Applicant's invention employs combinations of design techniques to achieve high performance and reduced manufacturing cost for a variety of types of synchronous machines. The initial discussion and figures refer to a linear machine with permanent magnet field, but the teachings are applicable to a wide class of rotary and linear machines with either permanent magnet or electromagnet fields and including machines using superconductors.

Figure 1A:
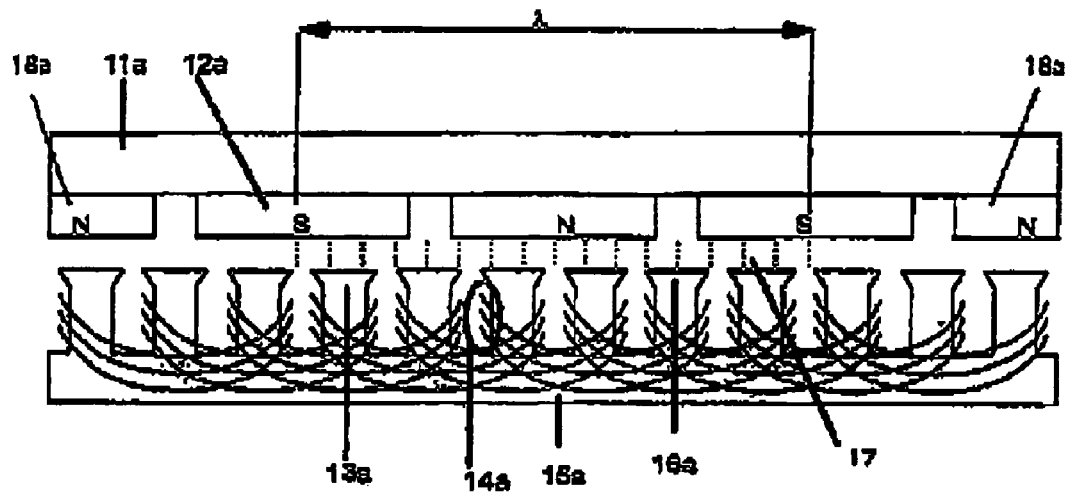
FIG. 1A shows a cross-sections of a conventional linear synchronous machine.
Figure 1B:
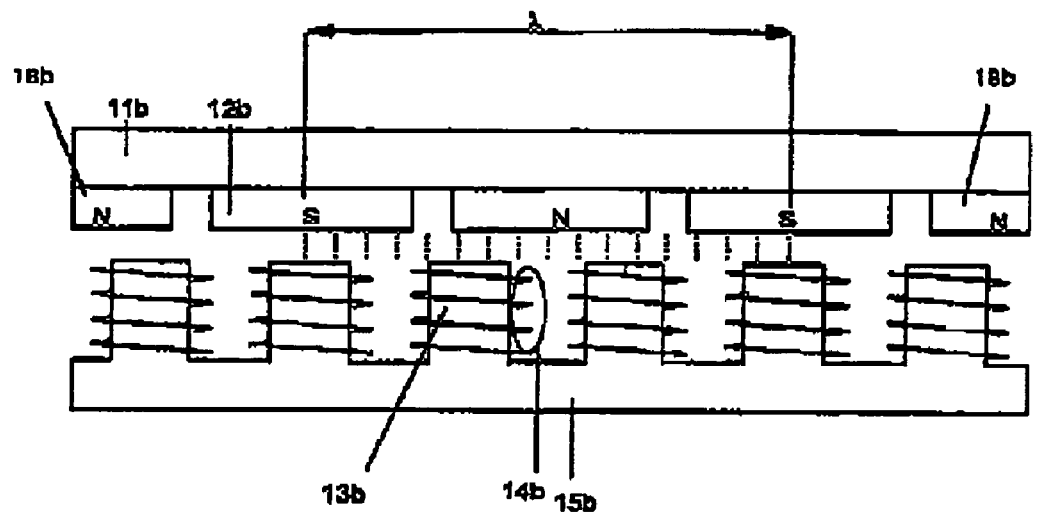
FIG. 1B shows a linear synchronous machine according to the invention.

FIG. 1a is an example of a prior art LSM and FIG. 1b is an example of an LSM according to one practice of the invention. In this Figure the field structures are composed of back iron, 11a and 11b, and permanent magnets, defined by poles 12a and 12b and half-poles 18a and 18b. The field (or "field structure") and armature are both 2λ long, where wavelength λ is defined in the Fig. The field has three full-poles and two half-poles with half-poles used at the ends of the field in order to minimize end effects. In an actual motor the field is usually longer than 2λ and is an integer number of wavelengths long. For linear motors the armature is usually longer than the field, but the reverse can be true. For rotary motors the armature and field are wrapped in a circle and are usually the same length. The laminations have teeth, 13a and 13b, and the slots between the teeth hold a multi-phase winding. The back iron for the armature, 15a and 15b, carry the flux between the teeth. The windings, 14a and 14b, are wound in slots in the laminations. In the case of the conventional motor the teeth have tips, 16a, but these are omitted in one version of the proposed design.

In FIG. 1a there are 6 slots per wavelength and the windings are a half wavelength long. Note that the end turns must curve down so as to allow each slot to have as many turns as possible; the need to deflect the end turns limits the practical depth of the slots. The slots are partially closed by the tips on the teeth in order to reduce cogging and improve performance.

FIG. 1b has only three slots per wavelength and non-overlapping windings. It has half as many windings per wavelength and is obviously much simpler to wind. Designers have avoided this approach for what turn out to be unjustifiable reasons. The inventors have discovered that the embodiment illustrated in FIG. 1b achieves superior performance and lower manufacturing cost, some of the reasons for which are evident in the following discussion.

Conventional wisdom suggests that one needs to have partially closed slots for the winding in order to minimize the magnet volume required, but the inventors have discovered that if the permanent magnets have nearly unity permeability or the air gap is relatively large, then the magnetic field lines 17 can almost as easily enter the armature teeth through the sides of the slots. By not using partially closed slots there is more room for the winding, the winding inductance is lower, and it is easier to wind the armature with minimum-length turns of wire.

Conventional wisdom also suggests that the design of FIG. 1b will have very large cogging forces. The inventors have further discovered that if the magnet dimensions are properly chosen there will be very little cogging force and that, moreover, the proper dimensions to reduce cogging will also produce a cost effective design.

Finally, conventional wisdom suggests that using non-overlapping windings will lead to inefficient operation because of the reduced pitch of the winding. However, by using fewer slots per wavelength with no overlaps in the winding it is possible to use deeper slots for the winding, and the end turn resistance of the windings is substantially reduced. With shorter end turns and open slots the winding inductance is lower it is possible to use a shorter pole pitch with resulting higher frequency excitation. This reduces the mass of back iron required and leads to a lighter motor, especially in the case where the field is provided by permanent magnets.

An advantage of the illustrated embodiment is that there is less attractive force between the field and armature for a given propulsive force. This is due to the fact that some of the magnetic field lines enter the armature teeth from the side instead of from the top so they do not create an attractive force. In the case of linear motors this can be a significant advantage, particularly when very large attractive forces create added cost for wheels and support structure.

Figure 2A:
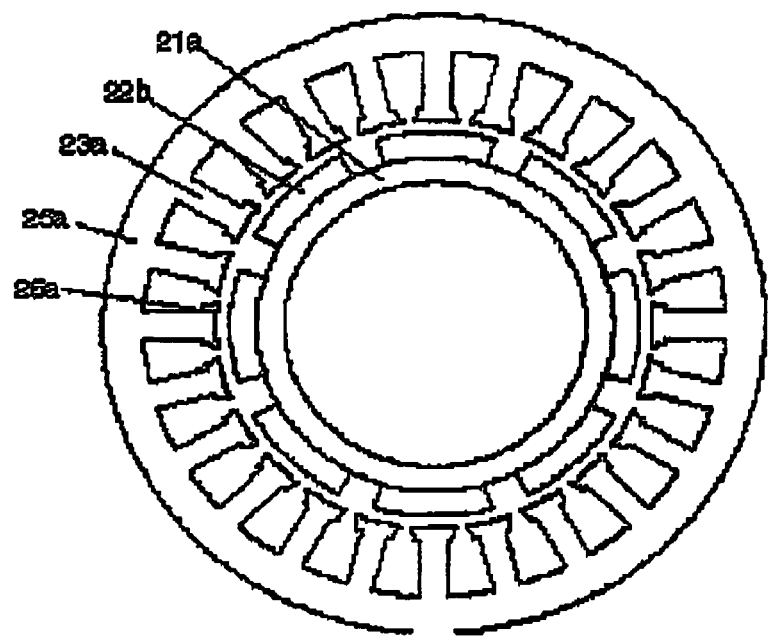
FIG. 2A shows a cross-sections of a conventional rotary synchronous machine.
Figure 2B:
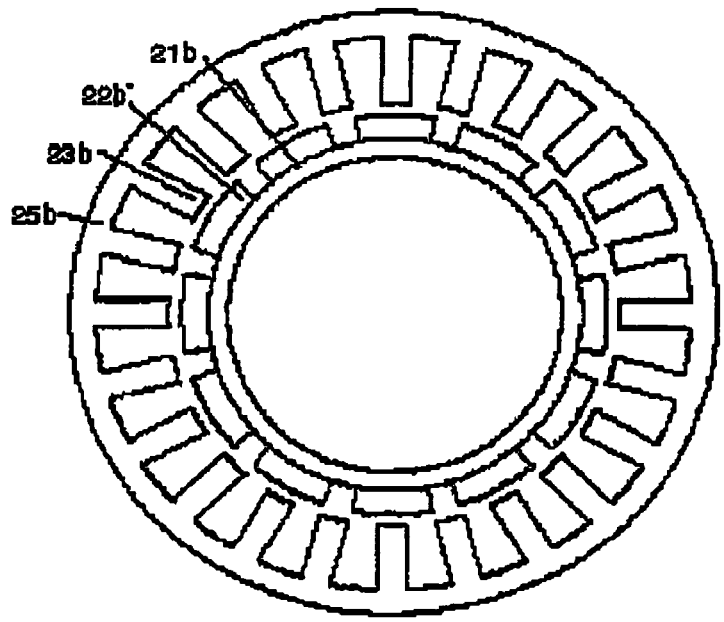
FIG. 2B shows a rotary synchronous machine according to the invention.

FIG. 2 shows a rotary version of the same structures shown in FIG. 1. The windings have been omitted, but otherwise the designs are very similar to the linear motor equivalents. Note that the rotary motor can also be built with the field magnets on the inside and the armature winding on the outside. The ability to build motors in either rotary or linear form and with either the armature or the field as the moving part is very well known so that for this patent the focus is on the linear motors, but the methodology is equally applicable to rotary motors.

Reducing Cogging Force

Figure 3A:
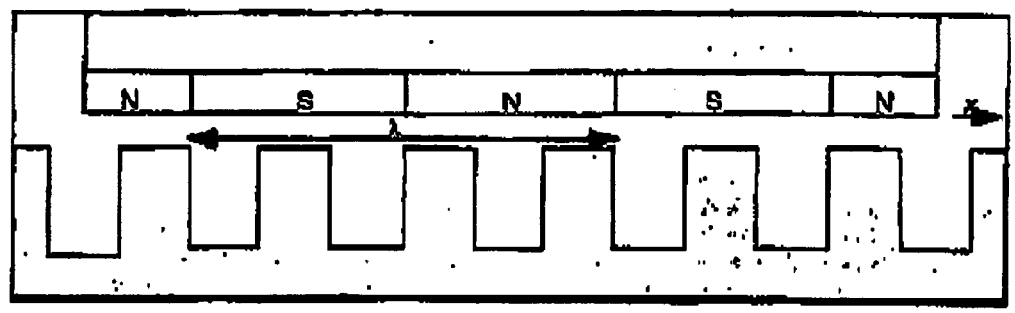
FIGS. 3A-3B are illustrations depicting the origin of cogging forces in prior art linear synchronous motors (LSM)
Figure 3B:
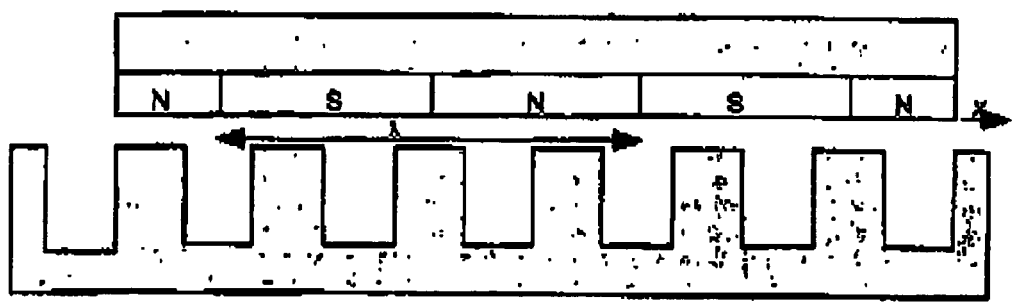

The illustrated embodiment reduces cogging force by proper choice of dimensions, particularly, for example, when there are relatively few slots and teeth for each wavelength of motor. Conventional wisdom teaches against using only three teeth per wavelength because there can be strong cogging forces, particularly when there are no tips on the teeth. The cogging problem is due to the interaction of the field magnets with the teeth and is independent of the winding. FIG. 3 shows an example where the magnet dimensions are badly chosen and the relative positions of the field and armature are chosen to illustrate to the origin of cogging. In FIG. 3a the system is in stable equilibrium in a "potential well" and if the field structure is pushed left or right there will be a restoring force. This is because the north and south poles of the magnets are symmetrically located relative to the teeth. In contrast, in FIG. 3b the north poles of the magnets are pulling to the left and the south poles are pulling to the right. By symmetry, and neglecting end effects due to the finite number of poles, it is clear that there is no net force, but if the field structure were to move either left or right there would be a force tending to move further in that direction. In short, the position shown in FIG. 3b is one of unstable equilibrium. In between these equilibrium positions there will be forces that fluctuate as the field moves relative to the armature. These pulsations in force are called cogging forces or ripple forces. In the case of rotary motors this is called torque ripple.

Typical Field Designs

FIG. 4 shows two embodiments of this aspect of the invention. The two examples are identical except for the permanent magnet field structures. In both cases there are three phases with phase A currents designated A+ and A− and similarly for phases B and C.

Figure 4A:
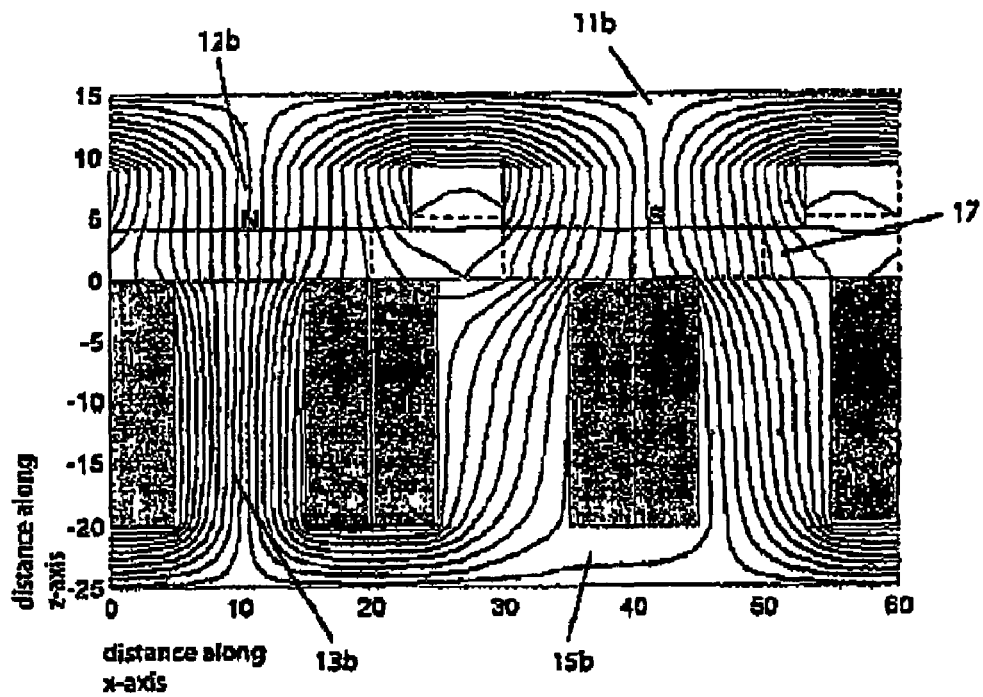
FIG. 4a shows a simple magnet array with only y directed magnets and FIG. 4b shows a modified Halbach array with both x and y directed magnets.
Figure 4B:
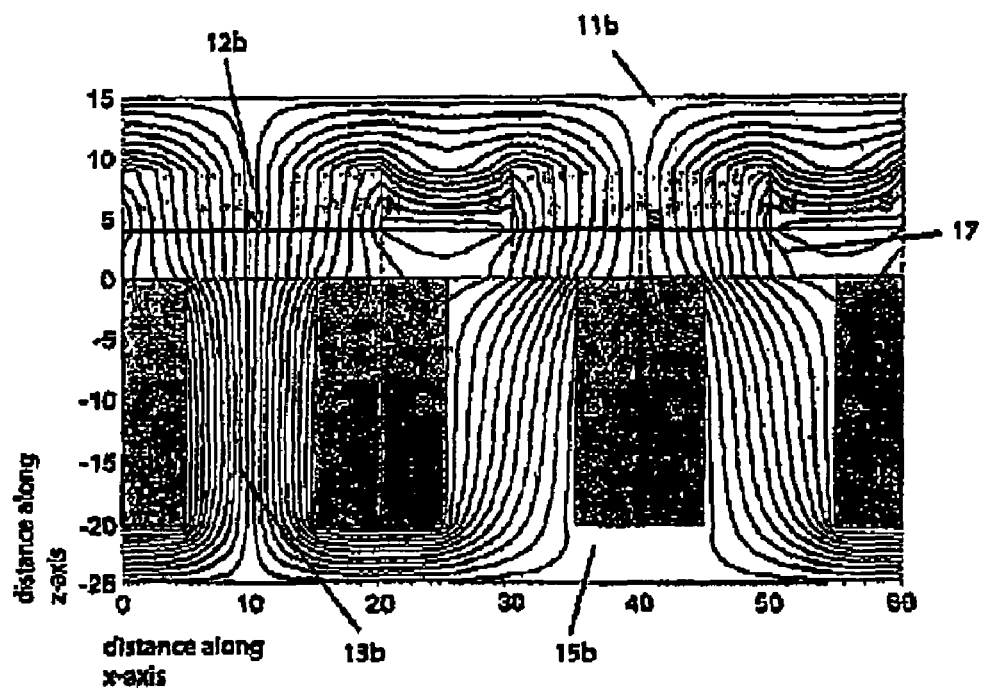

In FIG. 4a the field uses only y directed magnets with alternating magnet polarities. In FIG. 4b there are both y and x directed magnets, commonly called a modified Halbach array (a Halbach array is usually assumed to have no back iron.). In both of these figures, the magnet dimensions are chosen so as to minimize cogging force. The Halbach array gives somewhat more force but uses more permanent magnets. With the Halbach array the back iron can be thinner and thus the field can be significantly lighter as well as producing more force.

Other types of magnet arrays can be used to advantage. For example, by tailoring the field it is possible to reduce both cogging forces and reluctance forces.

Analysis of Forces in a Synchronous Machine

There are three categories of force in any synchronous machine: forces due to the interaction of the winding current with the field and proportional to the product of armature current and field strength; forces due to variable reluctance of the winding and proportional to the square of the armature current; and cogging forces due to the interaction of the field with the ferromagnetic structure of the armature and proportional to the square of the strength of the field magnets. Although there are cases where reluctance forces or cogging forces may be desirable, the illustrated embodiment suppresses most of the force due to the interaction of the armature ferromagnetic structure 13b, 15b with the field magnets 12b.

In the following discussion we make certain assumptions concerning the motor structure:

There are assumed to be two identical field pole structures 12b, 18 per wavelength λ and they are symmetric in x and have equal and opposite polarity.

There are n teeth 13b per wavelength and each tooth 13b is symmetric in the x direction and wound with a separate winding 14.

The windings 14 are energized from an n-phase AC source with successive windings 14 connected to successive phases so as to create a moving magnetic field 17.

The ferromagnetic structure has a very high permeability and the exact value of the permeability does not have a major impact on the field structure so a linear model can be used.

The strength of the field magnets 12b is defined to be a measure of the magnetic field 17 at the surface of the armature.

These assumptions allow the use of Fourier methods to analyze the forces. Because of the assumed linearity of the model it is possible to relate each of the three categories of force to particular harmonics in a Fourier analysis of the forces. One way to show the nature of these forces is to put a current in the windings that corresponds to a particular point in time and then move the field relative to the armature. Ideally the force would vary sinusoidally with position.

As an example, assume that the permeability of the permanent magnets is the same as for free space so there are no reluctance forces. A Fourier analysis of the force shows that the only harmonics present are 1, 5, 6, 7, 11, 12, 13, . . . We can divide these forces into two categories: multiples of 6 and all the rest. A further analysis shows that the multiples of 6 forces are proportional to the square of the strength of the field magnet while the other forces are proportional to the armature current times the field strength. If the permeability of the magnets is not that of free space then additional frequencies are present due to reluctance forces. Table 1 gives the harmonics for each category of force and for different number of phases. In this Table parameter p is the number winding slots, which is assumed to be the same as the number of phases, and m is the least common multiple of p and two (because there are two symmetric poles in the field). It does not matter how the armature is wound as long as the winding is excited with p phases so that if the field moves 1/p times the wavelength the field will be the same, just shifted in time by 1/p of a cycle.

TABLE 1

Harmonics for three categories of force and for different number of phases; m is the least common multiple of p and two and i is any positive integer.

| Phases | | Desired force | Reluctance force | Cogging force |
|---|---|---|---|---|
| p | m | $1, mi-1, mi+1$ | $2, mi-2, mi, mi+2$ | $mi$ |
| 3 | 6 | 1,5,7,11,14,... | 2,4,6,8,10,12,14,... | 6,12,18,... |
| 4 | 4 | 1,3,5,7,9,... | 2,4,6,8,10,12,14,... | 4,8,12,... |
| 5 | 10 | 1,9,11,19,21,... | 2,8,10,12,18,20,22... | 10,20,30,... |
| 6 | 6 | 1,5,7,11,14,... | 2,4,6,8,10,12,14,... | 6,12,18,... |
| 7 | 14 | 1,13,15,27,29,... | 2,12,14,16,26,28,30... | 14,28,42,... |
| 8 | 8 | 1,7,9,15,17,... | 2,6,8,10,14,16,18,... | 8,16,24,... |

Figure 5A:
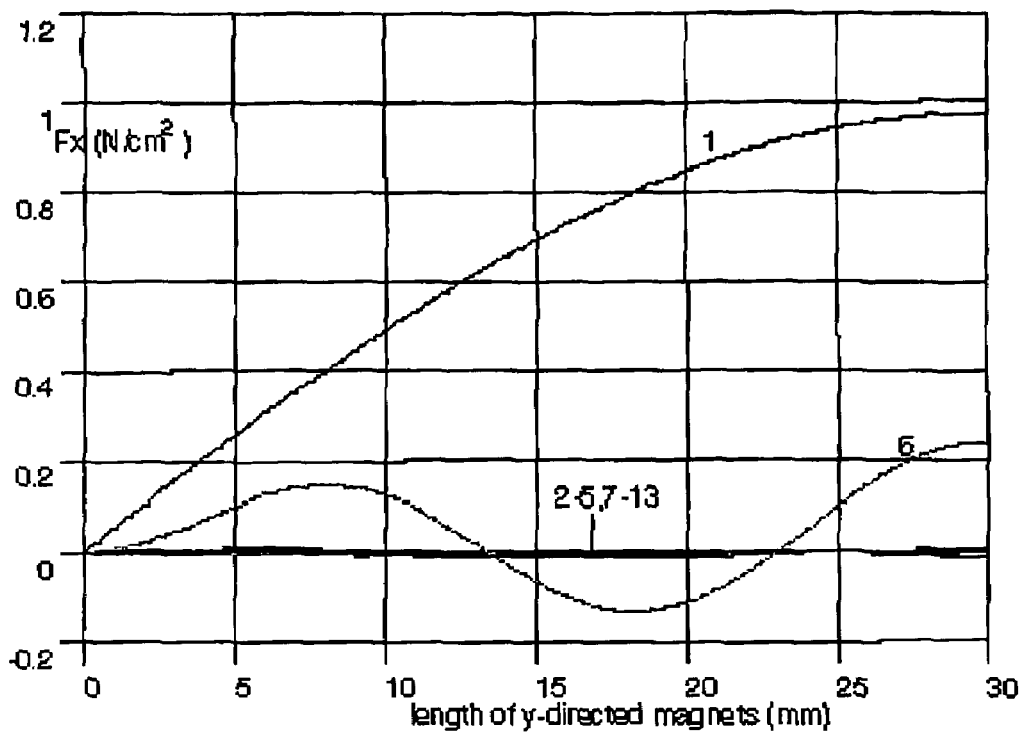
FIG. 5A shows the peak amplitude of the harmonics of the force as a function of magnet length for the LSM designs in FIG. 4A and with typical values for magnet permeability.
Figure 5B:
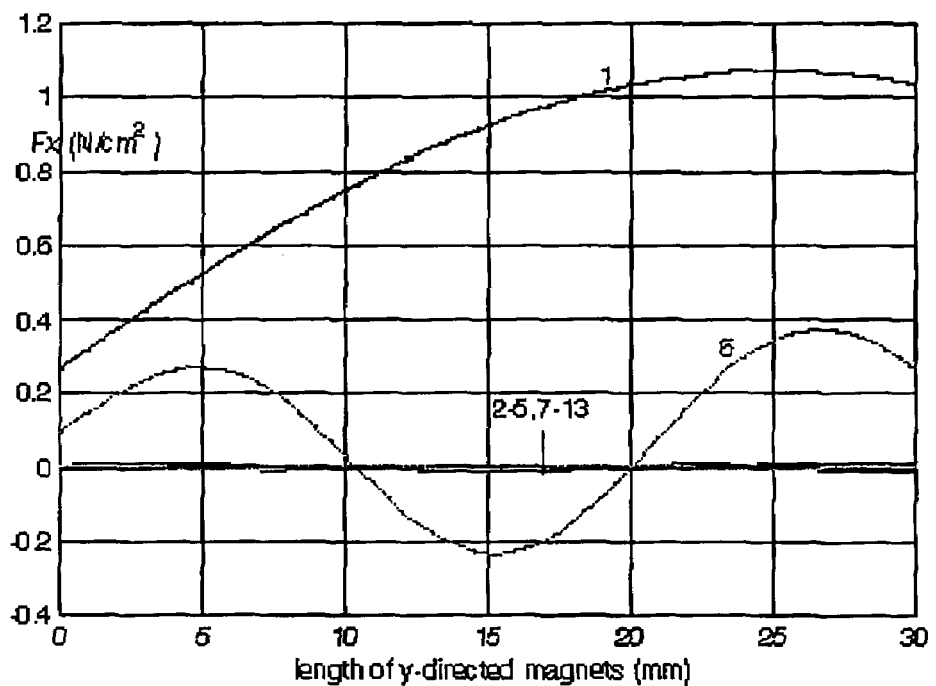
FIG. 5B shows the peak amplitude of the harmonics of the force as a function of magnet length for the LSM designs in FIG. 4B and with typical values for magnet permeability.

In many practical cases the only significant cogging force is the lowest harmonic, i.e. the 6th harmonic when there are three phases, so a key idea is to choose magnet dimensions that eliminate this component. FIGS. 5a and 5b show the amplitude of all significant frequencies as a function of magnet length for the field structures shown in FIGS. 4a and 4b. It is seen that for each structure there are two magnet lengths for which there is no 6th harmonic and the other harmonics are very small for all magnet dimensions. Hence, by choosing the magnet length to be one of the two values that eliminate the 6th harmonic force, negligible cogging will occur. In some cases, such as when magnet cost or weight is most important, or attractive force must be minimized, it is desirable to use the smaller magnet length, but in most cases the larger length will give better overall performance.

Note that if all dimensions are scaled by a factor then the optimum magnet length will be scaled by the same factor. Moreover, the inventors have discovered that the optimum magnet dimensions are not very sensitive to the air gap dimensions or to the depth of the slot. Therefore the relative dimensions for no 6th harmonic cogging for the structures of FIG. 4 can be used as approximate values for a range of motor designs. These relevant ratios are given in Table 2. For example, with the simple magnet array and for the highest force the magnet length should be 0.766 times the wavelength and the fundamental force is 92.3% of what it would be if the magnet length were chosen for maximum force, i.e. $\lambda/2$. Values in Table 2 depend somewhat on assumptions of ferromagnetic permeabilities and slot dimensions but can be used as a guide for initial design.

TABLE 2

Magnet dimensions for no cogging for structures of FIG. 4.

| Relative magnet length | | Simple field | Halbach field |
|---|---|---|---|
| First null | $x_m/(\lambda/2)$ | 0.448 | 0.348 |
| | $F_{x1}/F_{x1,max}$ | 0.650 | 0.708 |
| Second null | $x_m/(\lambda/2)$ | 0.766 | 0.668 |
| | $F_{x1}/F_{x1,max}$ | 0.928 | 0.964 |

One practical use of the foregoing is in 3-phase systems with three teeth per wavelength, but the use of a different number of teeth or phases may be desirable if there is a need for extremely low cogging forces. For example, the use of 5-phase excitation with 5 teeth per wavelength will give exceptionally low cogging force.

It might appear that the reluctance forces will not be present with the modified Halbach field structure. However, in most cases the field is constructed with high energy magnets that have a different permeability in the direction of magnetization from that for a direction normal to the direction of magnetization. For example, for high energy NdFeB magnets the relative permeability in the direction of magnetization is typically 1.06 while for any perpendicular direction it is about 1.2. Both of these values are sufficiently close to unity that in practice the reluctance forces are quite small.

The windings can be non-overlapping, as described previously, or can be wound with each winding enclosing two or more teeth. The nature of the winding will not affect the proper choice of magnet dimensions provided the phases satisfy the assumptions given.

Minimizing End Effects in Linear Motors or Segmented Rotary Motors

For most rotary motors the field and armature wrap around the entire periphery of the motor so both structures exhibit perfect periodicity. For linear motors and segmented rotary motors at least one of the structure has ends that destroy the periodicity and if no steps are taken to address end effects the motor may function less adequately. For purpose of the following discussion it is assumed that the magnet array is finite but the armature behaves as though it were infinitely long. A similar analysis is applicable if the reverse is true.

There are two distinct problems that can be addressed when designing the end magnets for an array: terminating flux from the neighboring periodic magnet array and reducing or eliminating cogging associated with the end magnets. Using half-length magnets at each ends of the otherwise periodic arrays partially solves both of these problems. In particular, it leaves a cogging force that has its main frequency component at half the frequency of the cogging force from the periodic array. For example, with three slots per wavelength for a periodic array, the cogging frequency is six times the fundamental force frequency and the dominant term from the end magnets is three times the fundamental frequency. A preferred approach eliminates the third harmonic term without increasing the sixth harmonic term.

In order to further eliminate the major cogging terms it is desirable to adjust the size and location of the end magnets. The recommended design procedure is as follows:

1. Choosing parameters for the periodic arrays in accord with a design that assumes there are no end effects; and
2. Choose the size of the end magnets and their spacing from the periodic array to preserve the periodicity and also eliminate cogging forces.

Figure 8:
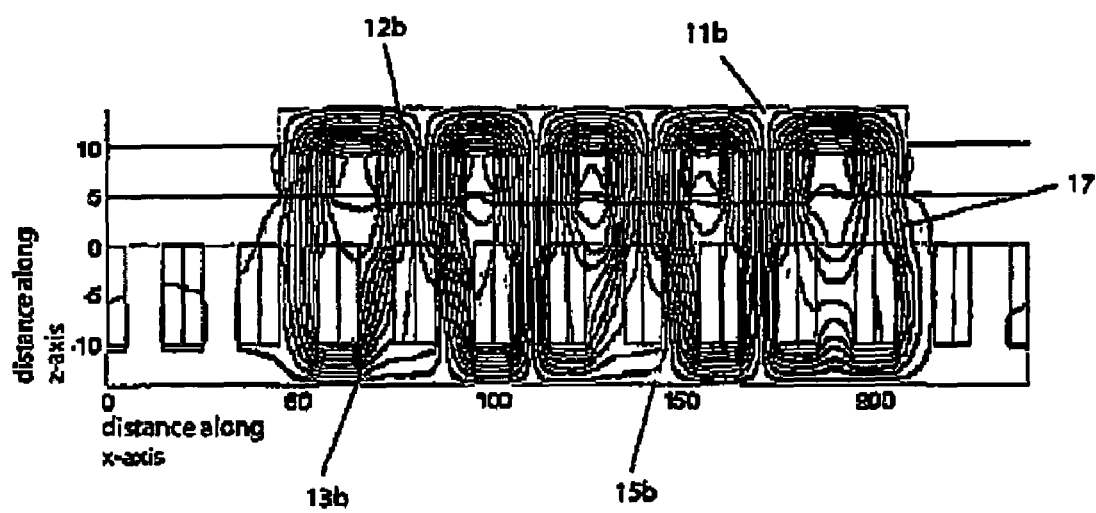
FIG. 8 shows flux patterns for a linear synchronous motor according to the invention with field (or stator) end magnets arranged to terminate flux and minimize cogging.

In most cases this can only be done by adjusting both the height and the length of the end magnets and the spacing between these magnets and their neighbors. FIG. 8 (in which the horizontal and vertical scales are different) shows an example of a design that was done this way. Note that the flux in the center magnets acts as though the array were periodic. A detailed analysis shows that there is relatively little third or sixth harmonic cogging force. The relative dimensions for the structure in this figure are:

| Parameter | Dimension |
| --- | --- |
| Wavelength | 60 |
| Magnetic gap | 4 |
| Length of periodic magnets | 23 |
| Height of periodic magnets | 5 |
| Length of end magnet | 14 |
| Height of end magnets | 4 |
| Spacing between end magnets and neighbors | 11 |

These dimensions are based on a 2D analysis and some adjustment must be made to deal with 3D effects since these depend on the ratio of the width of the magnet to the magnetic gap.

Machines with an Electromagnet Field

Figure 6:
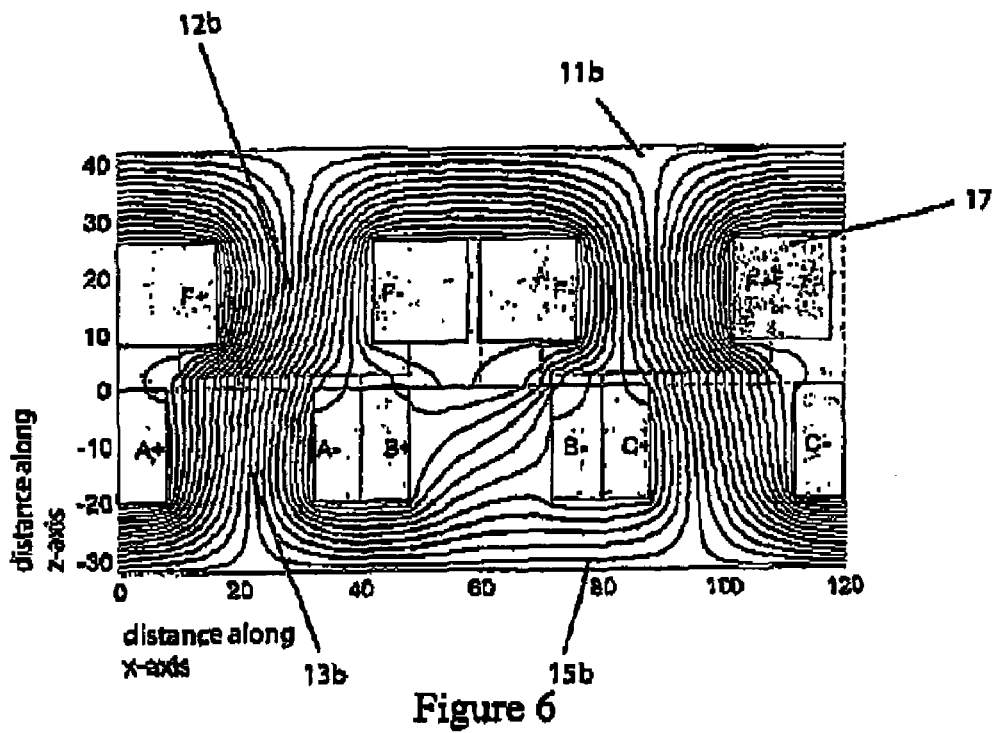
FIG. 6 shows an example of the invention applied to an LSM with electromagnetic field.
Figure 7:
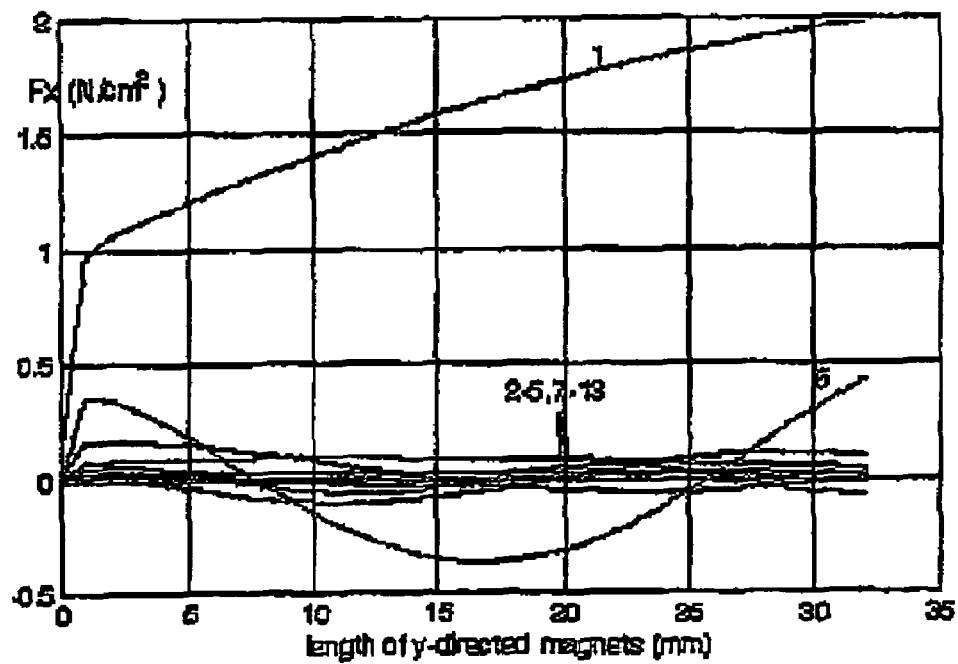
FIG. 7 shows the peak amplitude of the harmonics of the force as a function of magnet length for the LSM designs in FIG. 6.

The embodiments described above have used permanent magnet fields but the invention is also applicable to motors with electromagnetic fields. This is particularly important for very large motors and for motors where it is desirable to control the field intensity. FIG. 6 shows an example of a linear motor with electromagnetic field. It has twice the wavelength of the permanent magnet examples and has a field winding excited by DC currents designated F+ and F−. The air gap is smaller than with a permanent magnet field because it would take an excessive amount of field power to operate an electromagnetic field with a large gap. FIG. 7 shows a plot of harmonics vs. pole pitch. It is similar to that for the permanent magnet field except that the reluctance forces are much larger. However, the cogging force can be dramatically reduced by using methods described in this patent. The reluctance forces can then be reduced or compensated for by shaping the pole pieces and by controlling the waveform of the winding currents.

Described above are synchronous motors and machines meeting the desired objects, among others. Those skilled in the art will, of course, appreciate that the illustrated embodiments are merely examples of the invention and that other embodiments, incorporating modifications thereto, fall within the scope of the invention, of which we claim:

The invention claimed is:

1. In a synchronous motor comprising one or more field structures and one or more armatures, the field structure having poles defining a magnetic field and the armature having teeth with slots therebetween and coil windings wound in those slots, the improvement wherein
    half-poles at the end of at least one field structure are arranged so as to minimize a third force harmonic between the field structure and the armature without increasing a sixth harmonic therebetween.

2. In a synchronous motor according to claim 1, wherein the poles of the field structure define a magnetic field of wavelength $\lambda$, the further improvement wherein relative dimensions for the field structure are selected in substantial accord with the following table:

| Parameter | Dimension |
| --- | --- |
| Wavelength | 60 |
| Magnetic gap | 4 |
| Length of periodic magnets | 23 |
| Height of periodic magnets | 5 |
| Length of end magnet | 14 |
| Height of end magnets | 4 |
| Spacing between end magnets and neighbors | 11 |

3. In a synchronous motor comprising one or more field structures and an armature, the field structures having magnetic poles and the armature having teeth with slots therebetween and coil windings wound in those slots, the improvement wherein
    the poles and teeth are dimensioned with respect to one another so as to minimize selected force harmonics, those selected force harmonics being ones that are proportional to a square of pole strength,
    the poles define a magnetic field of wavelength $\lambda$, and a ratio of magnet length to $\lambda/2$ is substantially 0.45:1
    a half-pole is provided at the end of at least one field structure.

4. In a synchronous motor according to claim 3, the further improvement wherein the poles defining a magnetic field of wavelength $\lambda$, the further improvement wherein a ratio of number of teeth to wavelength is 3:1.

5. In a synchronous motor according to claim 3, the further improvement wherein extensions are absent from tips of a plurality of teeth.

6. In a synchronous motor according to claim 3, the further improvement wherein the poles and teeth are dimensioned with respect to one another so as to minimize a sixth force harmonic therebetween.

* * * * *